July 28, 1942.  J. H. KENNEDY  2,291,042
METHOD OF CONCENTRATING VALUES AND SEPARATING MAGNETIC MATERIAL
Filed Nov. 4, 1939   3 Sheets-Sheet 1
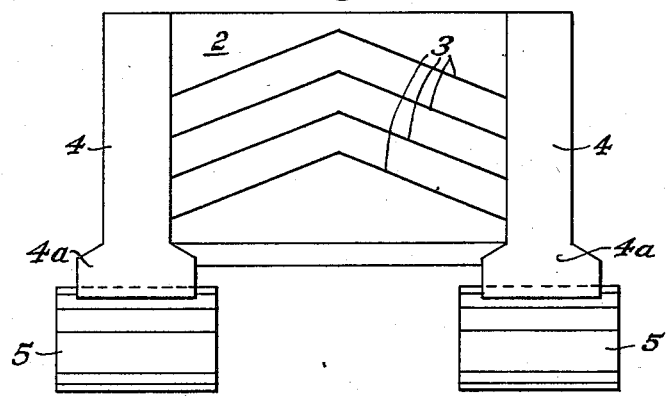
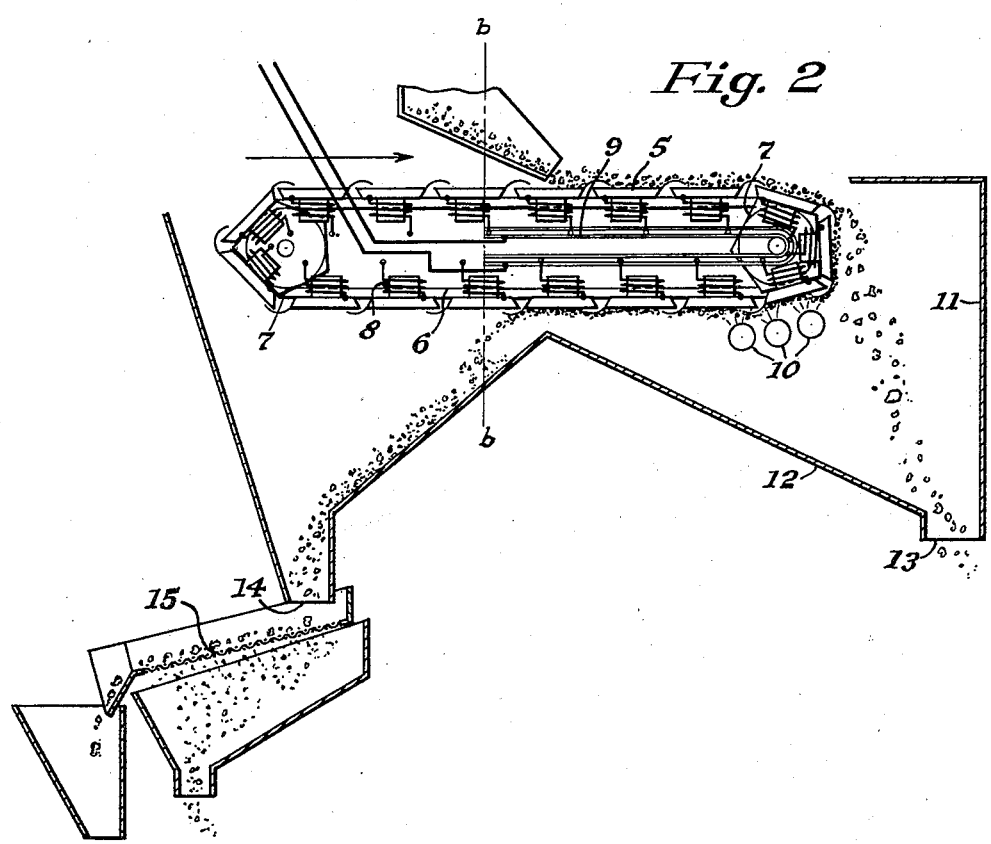
INVENTOR
James H. Kennedy
By
Clarence P. Byrnes
His attorney

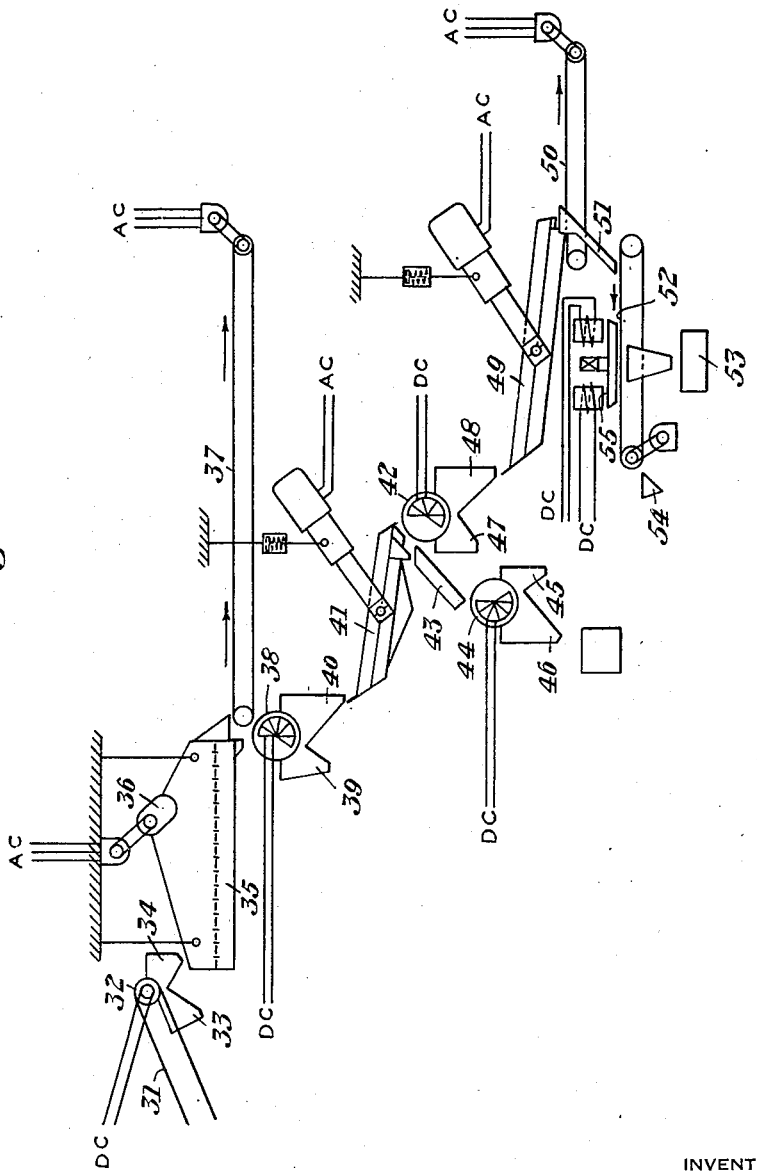

July 28, 1942.  J. H. KENNEDY  2,291,042

METHOD OF CONCENTRATING VALUES AND SEPARATING MAGNETIC MATERIAL

Filed Nov. 4, 1939  3 Sheets-Sheet 3

INVENTOR
James H. Kennedy
By
Clarence P. Byrnes
his attorney

Patented July 28, 1942

2,291,042

UNITED STATES PATENT OFFICE 2,291,042

METHOD OF CONCENTRATING VALUES AND SEPARATING MAGNETIC MATERIAL

James H. Kennedy, Lansdowne, Pa., assignor to Morgan Concentrating Corporation, Philadelphia, Pa., a corporation of Delaware Application November 4, 1939, Serial No. 302,864

3 Claims. (Cl. 209—40)

In concentrating values from aggregates found in placer ground most processes (either wet or dry) depend on the difference in specific gravity of the materials found in the aggregate to permit their respective separation. Starting with the original aggregate to be treated the procedure consists of separating by some means of flotation the heavier specific gravity particles and discharging as waste the lighter specific gravity particles. This means that as the procedure continues of concentrating down to the desirable materials of heavier specific gravity, in each step in the process the concentrates to be again treated and handled have a continuously increasing average specific gravity. In most placers, whether they contain as desirable elements gold, scheelite (tungsten ore), galena (lead ore) or other valuable materials or metallic compounds, they are universally found to have with them various oxides of iron, titanium, and other unwanted metallic compounds.

These materials are commonly known as black sands, or placer iron in their larger particle sizes, and are in most cases, usually about 90% of their total, magnetic. In all concentrating processes these unwanted materials in practical operations are known as gold robbers because of their proclivity to pack in riffles and to cause continual difficulties, due mainly to the fact that of the unwanted part of the total aggregates, they alone have a high enough specific gravity, as concentration of the original aggregates continues, to raise to a danger point the average specific gravity of the mass from which the final desirable products have not yet been removed. The amount of these unwanted oxides in the original aggregates varies usually from about 1 to 3% and it will be evident that in concentrating processes where reductions are from 50 to 1 in some processes, while in others the reduction is 5000 to 1, this original 1 to 3% causes a sufficiently high average specific gravity to remain in the concentrated material to make further separation difficult. This concentrate, usually more than fifty percent black sand, makes it very difficult to cause a final separation from the concentrate of gold, even though black sand has a specific gravity of about (5) five while gold has a specific gravity of about (19) nineteen. It takes small imagination to see how much more serious a task it is to separate, for example, scheelite (tungsten) from such a concentrate with a specific gravity of only about (6) six. This is true of other valuable mineral compounds. It therefore becomes obvious that the removal by any method of this undesirable relatively heavy specific gravity material whether the process be wet or dry reduces the cost, the time required, and increases the efficiency of recovery of the desirable large or small particle size material, within the original aggregate. It has further been found that at times there is a percentage of oxides that are very weakly magnetized and I have found that these can be separated by the application of high intensity magnetism.

I have discovered that I can to advantage combine steps of wet or dry concentration with magnetic separation of much or most of the black sand content in such a way as to reduce the expense, time, and work of final recovery of the desired values.

In the drawings, in which I show diagrammatically a preferred form of apparatus for carrying out my invention, and illustrate one form of dry concentrator system combined with magnetic separation of much of the black sand:

Figure 1 is a diagrammatic top plan view of a dry concentrator and feed therefrom to a magnetic separator;

Figure 2 is a diagrammatic side sectional elevation thereof;

Figure 3 is a diagrammatic side elevation or line drawing showing the flow through a chain of apparatus which utilizes magnetic separation in one or more steps in the cycle.

Figure 4:
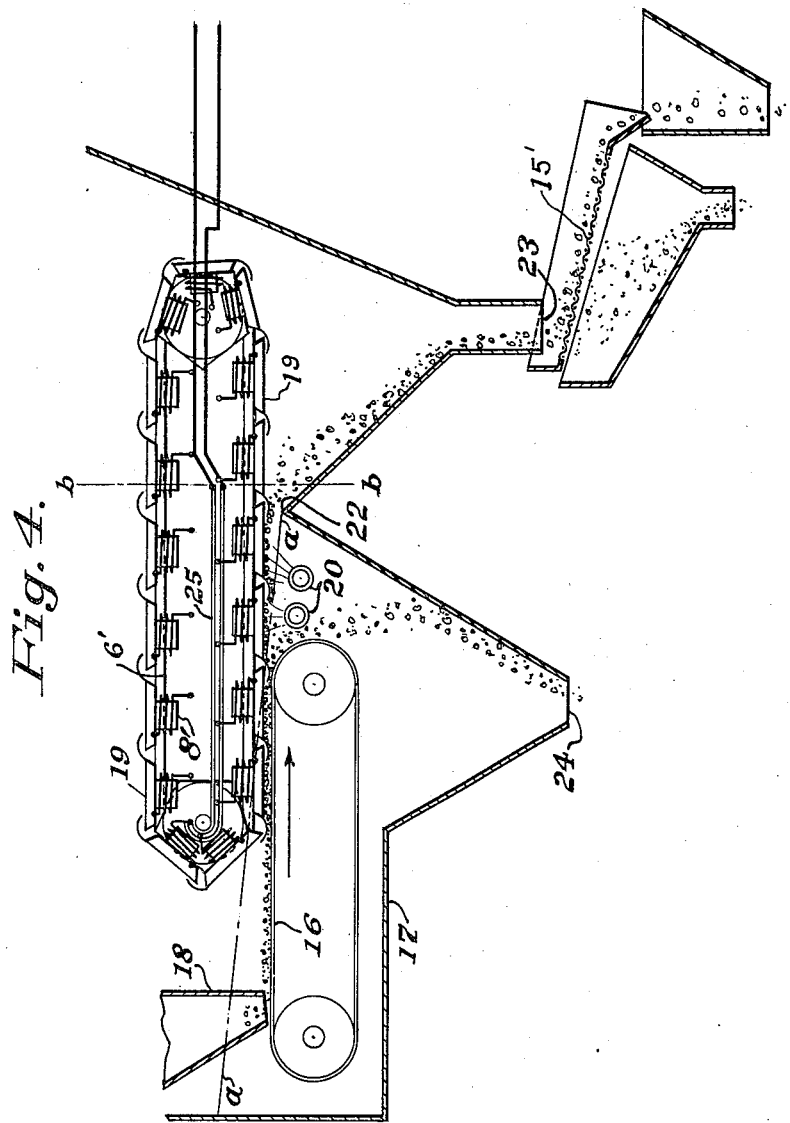
Figure 4 is a view similar to Figure 2 showing my invention as applied to wet recovery.

In Figure 1 the dry concentrator consists of a bed or table 2 having transverse flutes or riffles 3 which extend to its side edges. This bed is preferably porous permeable (foraminated), inclined forwardly and downwardly, and vibrated. Flotation air is preferably forced up through it and it is generally as disclosed in Morgan and Morgan U. S. Patent No. 2,155,235 with improvements as set forth in my copending application Serial No. 337,320, filed May 21, 1940. That is, the bed is of a type which will permit the passage of gaseous fluid therethrough, but will at the same time prevent the passage of finer portions of the value content of the aggregate. By "fines," I have reference to materials or particles such as will easily conglomerate with other materials and can be passed through an ordinary mesh screen. Those skilled in the art will perceive that a large portion of the value content of such aggregates as are found at placer locations may be in the form of "fines." As set forth in the copending application, I contemplate screening, trommeling, and disintegrating the aggregate particularly where it contains conglomerated materials. The vibration is preferably a straight line vibration carried in through connections passing through its center of gravity.

From the grooves, flutes or raised riffles 3, the concentrates containing black sand and values drop down into side feed channels 4 which are preferably inclined forwardly and downwardly and provided with enlarged front portions 4a to make the moving beds of concentrates thinner and wider before they feed to the magnetic separators indicated at 5, 5, in Figure 1 and better shown in Figure 2.

The magnetic separators may be of any efficient or desirable type. In the form shown, each consists of a continuous chain and plate conveyor 6 moving over sprocket wheels 7, 7, one or both of which is driven. Each plate has a depending electromagnet 8 energized by conductor 9 to which current is supplied, this conductor extending through part of the travel of the conveyor and around its discharge end. Underneath the discharge end, I prefer to employ devices to mechanically remove fine values adhering to the black sand by air blowers, high speed brushes and/or vibrators indicated at 10. A casing 11 has a bottom 12 arranged with a transverse crest and directing dropping materials to one of two outlets 13 or 14.

In practice of my process, the concentrates drop into the side channels of the dry concentrator, and are fed upon the opposite magnetic separators 5. As the plates carry the layer forwardly, the magnetic parts thereof are held as the layer passes around the front end of its path, while the non-magnetic portions drop to outlet 13. Then the plates are later deenergized and the magnetic black sand portions drop to outlet 14. Here I have shown screening out the over-size by screen 15, the black sand proper passing through to waste. That portion not passing the screen may be milled and amalgamated if desired.

In Figure 3, I show an application of my invention to dry recovery, such as is described in Morgan and Morgan U. S. Patent 2,155,235, with improvements as set forth in my copending application Ser. No. 337,320. I contemplate inserting magnetic separators in the flow sheet at various locations depending on the character of material treated, and the specific gravity of material to be recovered. In this way as the material progresses through the various concentrations, by magnetically removing undesirable heavy metallic compounds, I constantly reduce the average specific gravity of the concentrates to be treated, thereby increasing the efficiency of the flotation action for recovery of desirable materials. In this figure, 31 is a rubber belt conveyor delivering material over a magnetic head pulley 32; 33 indicates a chute discharging magnetic material removed from the aggregate, and the latter passes through chute 34 to classifying screen 35, which is vibrated by a vibrator mechanism located at 36. 37 is a belt conveyor removing the over-size from screen 35. 38 is a magnetic separator which removes magnetic material from the screen undersize with chute 39 carrying off the undesirable magnetic material, while the remainder passes through a chute 40 to a concentrating table 41. The concentrates from this table pass through chute 43 over magnetic separator 44, from which the desirable materials pass out chute 46 and the magnetically-removed undesirable materials pass out chute 45.

The remaining material leaving concentrating bed 41 passes through magnetic separator 42 from which the undesirable magnetically removed material passes out chute 47 and the remaining material passes out chute 48 to a second concentrating table 49. The concentrates from table 49 pass out chute 51 over belt 52 where they may again be treated by magnetic separator 55 with high intensity magnetism for final separation, and in this process the undesirable materials are discharged as waste down chute 54 and, for example, such material as scheelite (tungsten ore), to storage bin 53. The tables 41 and 49 are preferably provided with straight line electric vibrators, as shown. The apparatus 42, 44, and 55 may be of any suitable type, see for example, Figures 2 and 4.

In Figure 4, I show applying my inventions to wet recovery. In this figure, 16 is a rubber belt conveyor moving in a water tank 17; and receiving wet concentrates from a jig or other wet concentrator through chute 18. The parts 6', 8', 15' correspond to the parts, 6, 8, and 15 of the embodiment of Figure 2. Overlapping part of this conveyor is a chain and plate conveyor having plates 19, under which and beyond the path of 16 are nozzles 20 from which issue water jets under sufficient pressure to dislodge and clean off non-magnetic material from the faces of the magnetized under plates 19. A transverse ridge 22 in the tank bottom directs descending material in different directions, the non-magnetic concentrates to outlet 24 and the magnetic to outlet 23. The plates are deenergized after passing this ridge by passing beyond contact conductor 25, as before. Water is preferably kept at about the level a—a, below the magnetic plate level. The operation here is about the same as in the first form, the current being cut off at about the line b—b.

The advantages of my invention result from largely and cheaply removing the black sand from concentrate values and thereby greatly reducing the expense of value recovery.

As each placer presents its individual problem, regardless of whether a wet or dry process is used, the location of the magnetic separators can be suitably varied within the flow sheet of the process used, to effect the greatest advantage for magnetically removing materials susceptible to magnetism. The drawings disclose representative preferred arrangements. The method of dry or wet concentration and apparatus therefor may be varied and other suitable forms of magnetic separators may be used, since I consider myself the first to combine magnetic separation with concentration of values, whether wet or dry, for the purpose of reducing the average specific gravity of a placer aggregate, increasing efficiency, and reducing costs of flotation and or dry concentration.

Since I previously pointed out that the present invention deals with commercial recovery of the value content of placer aggregates, and since such aggregates contain values in the form of fines, it will be apparent that one of the important features is the recovery of such fines. I concentrate the value content including the fines upon the basis of the higher specific gravity without a substantial loss of such "fines." It is the recovery of such fines which for the first time makes possible the practical utilization of ordinary placer deposits. As previously pointed out, I employ magnetic separation of magnetic materials to decrease the average specific gravity of the aggregate to thereby make practical an effective recovery of the important value materials, such as tungsten, gold, etc., particularly where the value content has a specific gravity approaching that of the magnetic materials. In this manner a high percentage cut of low specific gravity materials or a high percentage concentration of high specific gravity materials can be efficiently accomplished. The finer the "values" to be recovered and the nearer their specific gravities approach the specific gravities of the magnetic materials, the more difficult the problem of recovery becomes. The present invention makes possible the efficient recovery of materials of this classification.

I claim:

1. In the recovery of the value content of an aggregate such as found at placer locations wherein the aggregate contains magnetic materials and a value content of a specific gravity approaching that of the magnetic materials, the steps of increasing the average specific gravity of the aggregate by subjecting the aggregate to a combined gaseous fluid and straight-line-vibration floating actuation while gravity separating out the value content of the aggregate along a substantial plane without losing finer portions thereof, feeding the thus-separated out value content forwardly as substantially oppositely-directed streams toward opposite sides of the plane representing such gravity separation, spreading out such streams adjacent such opposite sides to widen and thin them, and then forwardly advancing the widened and thinned streams as a pair of segregated streams while separately-magnetically removing magnetic materials from each stream to decrease the average specific gravity thereof.

2. In the recovery of the value content of an aggregate such as found at placer locations wherein the aggregate contains magnetic materials and a value content of a specific gravity approaching that of the magnetic materials, the steps of increasing the average specific gravity of the aggregate by subjecting the aggregate to a combined gaseous fluid and straight-line-vibration floating actuation while gravity separating out the value content of the aggregate along a substantial plane without losing finer portions thereof, feeding the thus-separated out value content forwardly as substantially oppositely-directed streams toward opposite sides of the plane representing such gravity separation, spreading out such streams adjacent to such opposite sides to widen and thin them, forwardly advancing the widened and thinned streams as a pair of segregated streams while separately-magnetically removing magnetic materials from each stream to decrease the average specific gravity thereof, and thereafter increasing the average specific gravity of such streams from the standpoint of their value content by subjecting them to a combined gaseous fluid and straight-line-vibration floating actuation while separating out the value content without a substantial loss of finer portions thereof.

3. In the recovery of the value content of an aggregate such as found at placer locations wherein the aggregate contains materials susceptible to magnetism and a value content of a specific gravity approaching that of the materials susceptible to magnetism, the steps of increasing the average specific gravity of the aggregate by subjecting the aggregate to a combined gaseous fluid and straight-line vibration floating actuation while gravity separating out the value content of the aggregate along a substantial plane without losing finer portions thereof, feeding the thus-separated out value content forwardly in substantially oppositely directed streams toward opposite sides of the plane representing such gravity separation, and then, forwardly advancing the streams as a pair of segregated streams while separately-magnetically removing materials susceptible to magnetism from each stream to decrease the average specific gravity thereof.

JAMES H. KENNEDY.